Sept. 4, 1962  S. R. OVSHINSKY  3,052,830
ELECTRICAL CONTROL DEVICE AND PROCESS
Filed Feb. 16, 1959
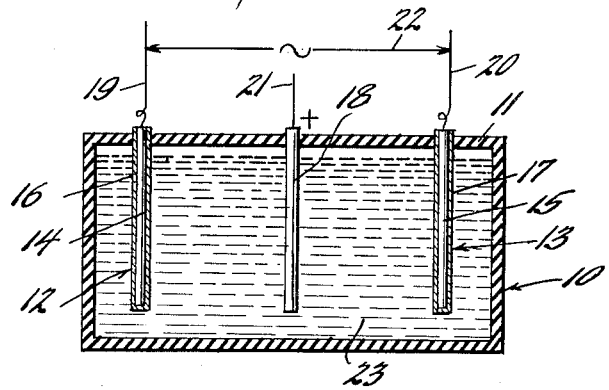
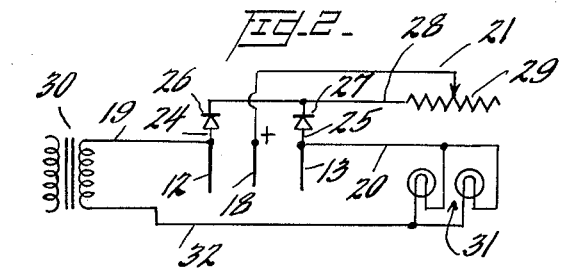
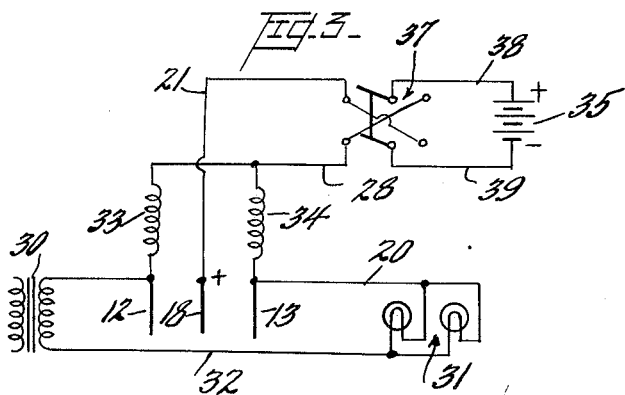
INVENTOR
Stanford R. Ovshinsky
BY  Leon Simon
ATTORNEY

United States Patent Office 3,052,830
Patented Sept. 4, 1962

3,052,830
ELECTRICAL CONTROL DEVICE AND PROCESS
Stanford R. Ovshinsky, Detroit, Mich., assignor to Ovitron Corporation, Detroit, Mich., a corporation of Delaware
Filed Feb. 16, 1959, Ser. No. 793,511
17 Claims. (Cl. 317—231)

The present invention relates to an electrical control device and a process for controlling alternating electrical currents.

More particularly, the present invention relates to a control device and process for controlling an A.C. circuit so that a relatively large load therein may be controlled by a relatively low power consuming D.C. circuit.

Control devices of the character described and having no moving parts other than a control switch or rheostat are extremely desirable devices for the control of automatic machinery and in other applications where a faithful and long-lasting control mechanism is essential. It is also necessary and desirable that the control device in itself consume little power.

It is well known that certain metals having a coating of oxide thereon and generally referred to in the rectifier art as filmed electrodes are capable of passing electrical currents when immersed in an electrolyte in only one direction, i.e., in the direction from the electrolyte through the oxide film into the metal. This phenomenon has been utilized for the rectification of alternating currents, the ordinary electrolytic rectifier of this type consisting of a filmed electrode and a non-filmed metal electrode impervious to the electrolyte in a suitable electrolytic bath. Since electrical currents are passed in only one direction, if two filmed electrodes are positioned in an electrolyte, obviously no current may pass in either direction by conduction through the electrolyte. Such an arrangement, however, is capable of functioning as a condenser and has been so used in the common electrolytic condenser. As may be understood, however, the A.C. resistance of such an arrangement is very high.

In the electrolytic condenser art, many attempts have been made to prevent the breakdown of the oxide films upon filmed electrodes and, for this purpose, a third electrode has been provided which is made negative relative to the filmed electrodes so that the presence of electrons or negative ions in the electrolyte will prevent the breakdown of the film and the device will function solely as an electrolytic condenser. An explanation of the action of such rectifiers appears in an article by Haring entitled "The Mechanism of Electrolytic Rectification," Journal of the Electrochemical Society, January 1952, volume 99, No. 1, at pages 30 to 37. On page 35 of this article, there is a symbolic representation of the barrier in tantalum oxide film.

In accordance with the present invention, the surprising discovery has been made that, if there is provided an electrolytic bath, a pair of filmed electrodes, together with a third electrode, and that if the third, unfilmed electrode is made positive relative to the filmed electrodes, an alternating current circuit including the filmed electrodes and the electrolyte will pass an alternating current. This effect occurs if in the electrolyte there is present an additional source of metal ions; and alternating current flows as long as the third electrode, which may be termed a control electrode, is supplied with a D.C. positive bias. Although it is not desired to limit in any way the possible explanation for this discovery, it is believed that the additional metal ions are attracted to the surface of the filmed electrode and may even form upon this surface an extremely thin film of positive metal ions. Such a phenomenon overcomes and completely changes the characteristics of the oxide film when such film is functioning to block current, and the oxide film becomes a conductor so long as such metal ions are present. In any event, whatever the explanation, the fact remains that the circuit which includes the filmed electrodes and the electrolyte has a very low resistance and readily passes relatively large amounts of A.C. as long as the third or control electrode is positive.

It is one of the objects of the present invention, therefore, to provide a control device having no moving parts and consisting essentially of a pair of filmed electrodes in an electrolyte containing an additional source of metal ions, said filmed electrodes being arranged to ordinarily block A.C. current in a circuit including them and being capable of passing A.C. current when a positive potential is applied to the electrolyte.

A second object of the present invention is to provide a method for controlling the passage of alternating current in a circuit including a pair of filmed electrodes spacedly positioned in an electrolytic bath, including in addition to the electrolyte and additional source of metal ions, comprising applying a positive potential to the bath whereby alternating current flows through the circuit, the electrodes and bath and varying said positive potential to correspondingly vary alternating current flow through said circuit.

Other objects and advantages of the present invention will become apparent from the subsequent description and figures of the drawing, wherein:

FIGURE 1 is a diagrammatic section of the control device of the present invention;

FIGURE 2 is a schematic illustration of a circuit including a control circuit and a circuit to be controlled embodying the control device; and FIGURE 3 is similar to FIGURE 2 but illustrates a modified control circuit.

Referring to the drawings, and particularly FIGURE 1 thereof, the reference numeral 10 designates a vessel formed of any suitable plastic resistant to alkali and strong acid. Such plastics include, by way of example, hard rubber, polyethylene, et cetera.

As indicated, the vessel 10 is provided with a cover 11 which may serve to seal the interior of the vessel 10 or may be provided with suitable vents, not shown. Passing through the cover 11, and preferably sealed therein or fastened thereto in any suitable manner, are a pair of filmed electrodes, indicated generally at 12 and 13, having, as indicated, metal cores 14 and 15, an especially desirable metal being tantalum, and an oxide film thereon, indicated respectively at 16 and 17. Also supported by the cover 11 is a control electrode 18 which is preferably formed of a metal of good conductivity and substantially impervious to electrolytes. An especially desirable metal for this purpose is platinum, although other metals and alloys of metals having these characteristics and commonly known may be used.

Attached to the cores 14 and 15 are the conductors 19 and 20, respectively, and attached to the electrode 18 is the conductor 21. The conductors 19 and 20 form a part of a circuit to be controlled, this circuit being an alternating current circuit, as indicated by the arrow 22. The conductor 21, on the other hand, forms a part of a control circuit. When a D.C. current (constant or pulsating) flows through such control circuit so that the electrode 18 is provided with a positive charge or bias, alternating current will flow through the circuit to be controlled and including the conductors 19 and 20.

The device also includes an electrolyte within the vessel 10 and indicated at 23. Such electrolyte may completely fill the vessel or may partially fill the vessel, so long as the electrodes 12, 13, and 18 are immersed therein. In some instances, it is desirable that the electrolyte only partially fill the vessel 10 so that some space may be provided for gasses resulting from the electrolytic action. The electrolyte may be of a conventional type but is preferably of an acid character. Such acids include sulfuric, hydrochloric, phosphoric, as well as other mineral acids, and may also include organic acids of the proper characteristics as, for example, acetic. Mixtures of these acids may also be used. Of these acids, the mineral acids have been found especially desirable and by far the best acid electrolytes are sulfuric and hydrochloric acids. These acids are, of course, in water and an especially desirable concentration for sulfuric acid has been found to be approximately 30 percent by weight of sulfuric acid in water. For maximum efficiency, the concentration of hydrochloric best used is approximately 20 percent. It may be understood, however, that other concentrations of acid in water of the order of 30 percent are highly effective for the purpose and concentrations of sulfuric acid as low as 20 percent and as high as 35 percent have been successfully used to provide a highly efficient control device.

It is essential, further, that the electrolyte contain an added source of positive ions, preferably metal ions. Of the metal ions found most desirable, by far the best is the zinc ion. This source of metal ion may be derived from, for example, zinc metal dissolved in acid; but it is preferably provided by dissolving in the acid water electrolyte a metal, for example a zinc salt which is soluble in the acid water solution. Suitable salts in the case of sulfuric acid would be soluble salts of zinc with mineral acids, including zinc sulfate, zinc chloride, zinc acetate, et cetera. The same salts would also be suitable for use with hydrochloric acid, if hydrochloric acid is the electrolyte. Preferably, for maximum efficiency, sufficient salt is used to form a saturated solution of the salt in the electrolyte.

Referring once again to the figures of the drawing, and particularly FIGURE 2, the filmed electrodes 12 and 13 and the respective conductors 24 and 25 are shown connected to rectifiers 26 and 27. In turn, the rectifiers 26 and 27 are connected to a control circuit including the conductor 28, the variable rheostat 29 and the conductor 21. As previously set forth, the conductor 21 is connected to the control electrode 18. Also connected to the filmed electrodes 12 and 13, as previously set forth, are the conductors 19 and 20 which, as indicated previously form a part of an alternating current circuit, the conductor 19 being connected at its other end to the transformer 30 and the conductor 20 being connected to the load 31, indicated generally as lamps. The other end of the load is connected to the conductor 32 which is in turn connected to the transformer 30.

In actual operation of the control device and circuit just referred to, if an alternating current of the order of 80 volts is impressed upon the conductors 19 and 32, a D.C. current will be supplied to the control circuit through the wires or conductors 24 and 25. This D.C. current may only flow in one direction so as to make the control electrode 18 positive, and the amount of D.C. voltage which tends to be supplied to the control circuit will be determined by the variable rheostat or potentiometer 29. If the rheostat 29 is adjusted to present no resistance whatsoever, the amount of D.C. voltage in the control circuit will nevertheless reach a definite limit. Such a limit, for example, where the electrolyte consists of 30 percent sulfuric acid in water together with an amount of zinc chloride or sulfate to saturation, will be of the order of two or three volts. Further, the amount of current in the control circuit is self-limiting and, with no resistance at the rheostat 29, will nevertheless be of the order of twenty milliamperes. With a potential of 80 volts, the amount of alternating current which is caused to flow by this maximum control current may be as high as one ampere, depending, of course, on the load 31.

It will thus be seen that the gain through this control device in terms of power is of the order of 1,000 to 1. If, on the other hand, the resistance is increased so as to lower the impressed voltage or bias on the control electrode 18, the power flow through the controlled circuit is also diminished, and in a corresponding manner.

It may be noted that the device is operative with a switch in place of resistance 29 so that, upon closure of the switch, control bias is applied and, upon opening of the switch, no current will flow other than small leakage currents through the controlled A.C. circuit. It may be noted in this connection that, where a switch is used, the action of the control device in blocking A.C. current or allowing the A.C. current to flow is, as observed, substantially instantaneous. It may be noted further that, in place of a switch, the effect of the control electrode may be varied or changed as by withdrawing the control electrode 18 from the electrolyte.

FIGURE 3 represents a modification wherein, in place of the rectifiers 26 and 27, chokes 33 and 34 are provided. A separate source of D.C. current such as the battery 35, is also included in the control circuit. The purpose of the chokes is to prevent alternating current flow from the controlled circuit from interfering with the functioning of the control circuit. It will be noted further that the control circuit wires 21 and 28 are connected to a reversing switch 37 which is in turn connected to the battery 35 by wires 38 and 39. If the switch 37 then is closed upon its left terminals D.C. current will flow from the battery 35 through wire 38 and 21 into the electrode 18 to establish a positive bias upon the electrode and the electrolyte. If the switch is then reversed the negative pole of the battery 35 and the wire 39 will be connected to the wire 21 and the control electrode 18. Even though in most instances the effect of the removal of positive control bias on the control electrode 18 is very fast so that within a period of time of the order of a few milliseconds alternating current in the controlled circuit ceases, it has been found that reversing the bias upon the control electrode 18 is even faster. As may be understood the reversing switch 37 or a single switch may be used in the circuit of FIGURE 2 in place of the resistance 29.

I claim:

1. The method of controlling the passage of alternating current in a circuit including a pair of electrodes each having a film thereon capable of conducting a current in one direction only and spacedly positioned in an electrolytic bath including in addition to the electrolyte an additional source of metal ions, comprising applying a positive potential to said electrolytic bath whereby alternating current flows through said circuit, the electrodes and bath varying said positive potential to correspondingly vary alternating current through said circuit.

2. The method of claim 1 wherein the filmed electrodes are of tantalum having a film thereon of tantalum oxide.

3. The method of claim 1 wherein the filmed electrodes are of tantalum having a film thereon of tantalum oxide, the electrolyte is a mineral acid in water and the metal ions are derived from a metal salt dissolved in the electrolyte.

4. The method of claim 1 wherein the electrolyte is sulfuric acid in water and the metal ions are zinc ions.

5. The method of claim 1 wherein the electrolyte is hydrochloric acid in water and the metal ions are zinc ions.

6. The method of claim 1 wherein the filmed electrodes are tantalum having a film thereon of tantalum oxide, the electrolyte is sulfuric acid in water and the metal ions are zinc ions.

7. The method of claim 1 wherein the filmed electrodes are tantalum having a film thereon of tantalum oxide, the electrolyte is hydrochloric acid in water and the metal ions are zinc ions.

8. The process of claim 1 wherein the positive potential is reduced to zero to stop the flow of alternating current.

9. The process of claim 1 wherein the postive potential is reduced to zero and a negative potential is applied to said electrolytic bath to stop the flow of alternating current.

10. A control device comprising a pair of electrodes each having a film thereon capable of conducting current in one direction only and forming a part of an alternating current circuit to be controlled, said filmed electrodes being spacedly positioned within an electrolyte containing a source of metal ions, an unfilmed control electrode within said electrolyte, a control circuit connected to said control electrode and to said filmed electrodes, a direct current source in said control circuit arranged to impress a positive charge upon said control electrode and control means in said control circuit to vary the positive charge upon said control electrode whereby the alternating current flow through said controlled circuit is varied.

11. A control device comprising a pair of filmed electrodes of tantalum having a film thereon of tantalum oxide and forming a part of an alternating current circuit to be controlled, said filmed electrodes being spacedly positioned within an acid electrolyte containing metal ions, an unfilmed electrode within said electrolyte, a control circuit connected to said control electrode and said filmed electrodes, a direct current source in said control circuit arranged to impress a positive charge upon said control electrode and control means in said circuit to vary the positive charge upon said control electrode whereby the alternating current flow through said controlled circuit is varied.

12. A control device comprising a pair of filmed electrodes of tantalum having a film thereon of tantalum oxide and forming a part of an alternating current circuit to be controlled, said filmed electrodes being spacedly positioned within a mineral acid in water electrolyte containing zinc ions, an unfilmed electrode within said electrolyte, a control circuit connected to said control electrode and said filmed electrodes, a direct current source in said control circuit arranged to impress a positive charge upon said control electrode and control means in said circuit to vary the positive charge upon said control electrode whereby the alternating current flow through said controlled circuit is varied.

13. A control device comprising a pair of filmed electrodes of tantalum having a film thereon of tantalum oxide and forming a part of an alternating current circuit to be controlled, said filmed electrodes being spacedly positioned within a sulfuric acid in water electrolyte containing zinc ions, an unfilmed electrode within said electrolyte, a control circuit connected to said control electrode and said filmed electrodes, a direct current source in said control circuit arranged to impress a positive charge upon said control electrode and control means in said circuit to vary the positive charge upon said control electrode whereby the alternating current flow through said controlled circuit is varied.

14. A control device comprising a pair of filmed electrodes of tantalum having a film thereon of tantalum oxide and forming a part of an alternating current circuit to be controlled, said filmed electrodes being spacedly positioned within a hydrochloric acid in water electrolyte containing zinc ions, an unfilmed electrode within said electrolyte, a control circuit connected to said control electrode and said filmed electrodes, a direct current source in said control circuit arranged to impress a positive charge upon said control electrode and control means in said circuit to vary the positive charge upon said control electrode whereby the alternating current flow through said controlled circuit is varied.

15. The control device of claim 12 wherein the control means is a variable resistance.

16. The control device of claim 12 wherein the control means is a switch.

17. The control device of claim 12 wherein the control means is a reversing switch positioned in said control circuit between the direct current source and the electrodes whereby upon reversal of said switch the charge impressed upon said control electrode is negative.

References Cited in the file of this patent

UNITED STATES PATENTS

| | | |
|---|---|---|
| 1,077,628 | Mershon | Nov. 4, 1913 |
| 1,439,526 | Mershon | Dec. 19, 1922 |
| 1,709,427 | Bush | Apr. 16, 1929 |
| 1,924,606 | Hammond | Aug. 29, 1933 |
| 1,976,700 | Lilienfield | Oct. 9, 1934 |
| 2,743,399 | Bujan | Apr. 24, 1956 |
| 2,778,979 | Booe | Jan. 22, 1957 |